S. STONE.
FORMING HORSESHOE CALKS.
No. 95,745. Patented Oct. 12, 1869.
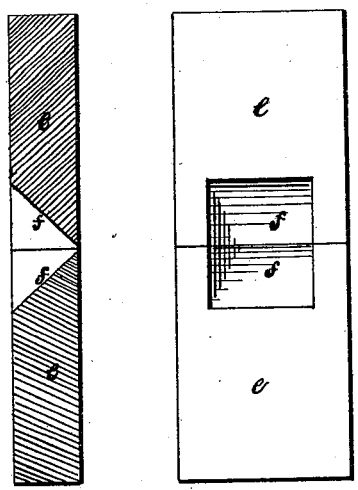
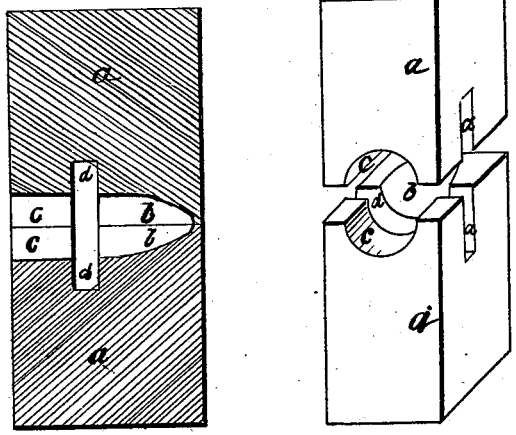

UNITED STATES PATENT OFFICE.

SAMUEL STONE, OF NORTH MANCHESTER, CONNECTICUT.

IMPROVED DIE FOR FORMING HORSESHOE-CALKS.

Specification forming part of Letters Patent No. 95,745, dated October 12, 1869.

*To all whom it may concern:*

Be it known that I, SAMUEL STONE, of North Manchester, county of Hartford, and State of Connecticut, have invented a certain new and useful Improvement in Dies for Shaping and Swaging Horseshoe-Calks; and to enable others skilled in the art to make and use the same, I will proceed to describe it, referring to the drawings, in which the same letters indicate like parts in each of the figures.

The nature of this invention consists in forming the swage and cutting dies in duplicate parts (upper and lower dies) of the required shape to produce the desired calk, said dies being arranged in the common way in a drop or press, and actuated in the usual manner.

The object desired to be attained thereby is to secure uniformity of size and shape and more rapidly execute and cheapen the manufacture.

In the accompanying drawings, Figure 1 is a perspective and sectional side view of the two-part dies for forming a calk, as shown in Fig. 3. Fig. 2 is a face and section edge view of the two-part cutting and swaging dies, for the purpose of cutting the calk from the bar after it is formed into the required shape, and also partially form the end of a second calk on the end of the bar before and in the act of cutting the calk from the bar.

*a a* are the upper and lower portions of the die.

*b* is that portion of the die which forms the calk proper or pointed portion thereof.

*c* is that portion of the die which forms the shank upon which, when in use, is formed a screw for securing it to the shoe.

*d* is a slit or open recess, formed across the face of the die, for producing a nut shape on the calk between the calk end and the shank, by which it may be turned firmly (by the use of a wrench) into the shoe. These dies, made as described, are secured in a drop or press and actuated in the common way.

*e e* are the cutting-off dies, provided with a recess-basil, *f*, which serves two purposes in connection with cutting off the calk. It serves to keep the bar, or to guide the bar directly over the cutter, and also partially form or shape the bar just back of the calk being cut therefrom into such shape as to prepare it in readiness to be introduced into the dies after the first calk has been cut therefrom. Thus the end of a bar or the end of several bars may be successively introduced to the action of the dies in rapid succession, and calks produced thereby in perfect uniformity of shape and in a rapid manner.

I believe I have thus shown the nature, construction, and operation of this invention, so as to enable others skilled in the art to make and use the same therefrom.

What I claim, and desire to secure by Letters Patent, is—

The dies for swaging the calk and shaping the bar and cutting the calk therefrom, substantially as set forth.

SAMUEL STONE. [L. S.]

Witnesses:
 N. C. WILDER,
 JEREMY W. BLISS.